Dec. 20, 1960 S. P. FINOCCHIARO 2,964,896
DEBRIS-GATHERING APPARATUS
Filed Oct. 2, 1958 7 Sheets-Sheet 1
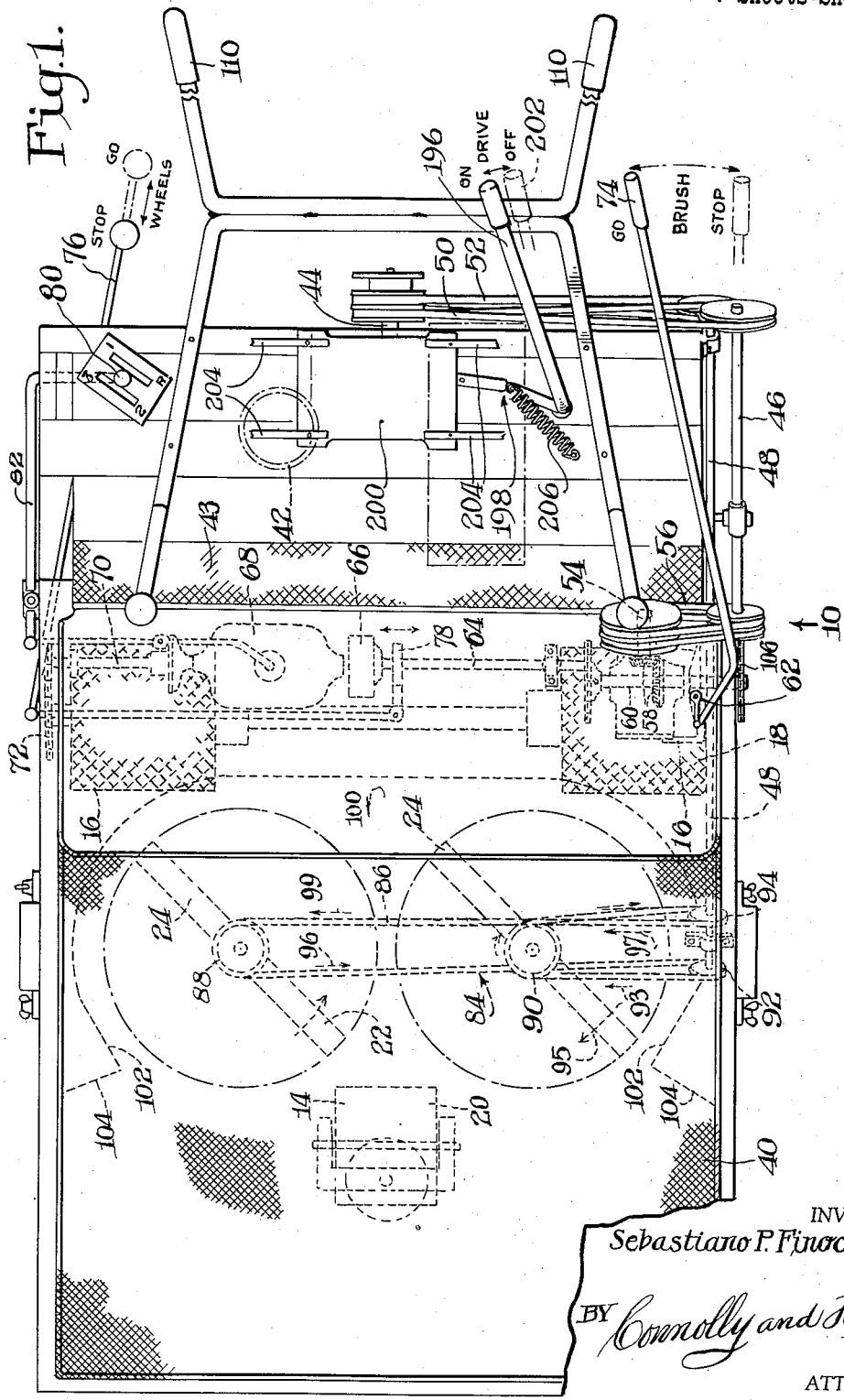
INVENTOR
Sebastiano P. Finocchiaro
BY Connolly and Hutz
ATTORNEYS

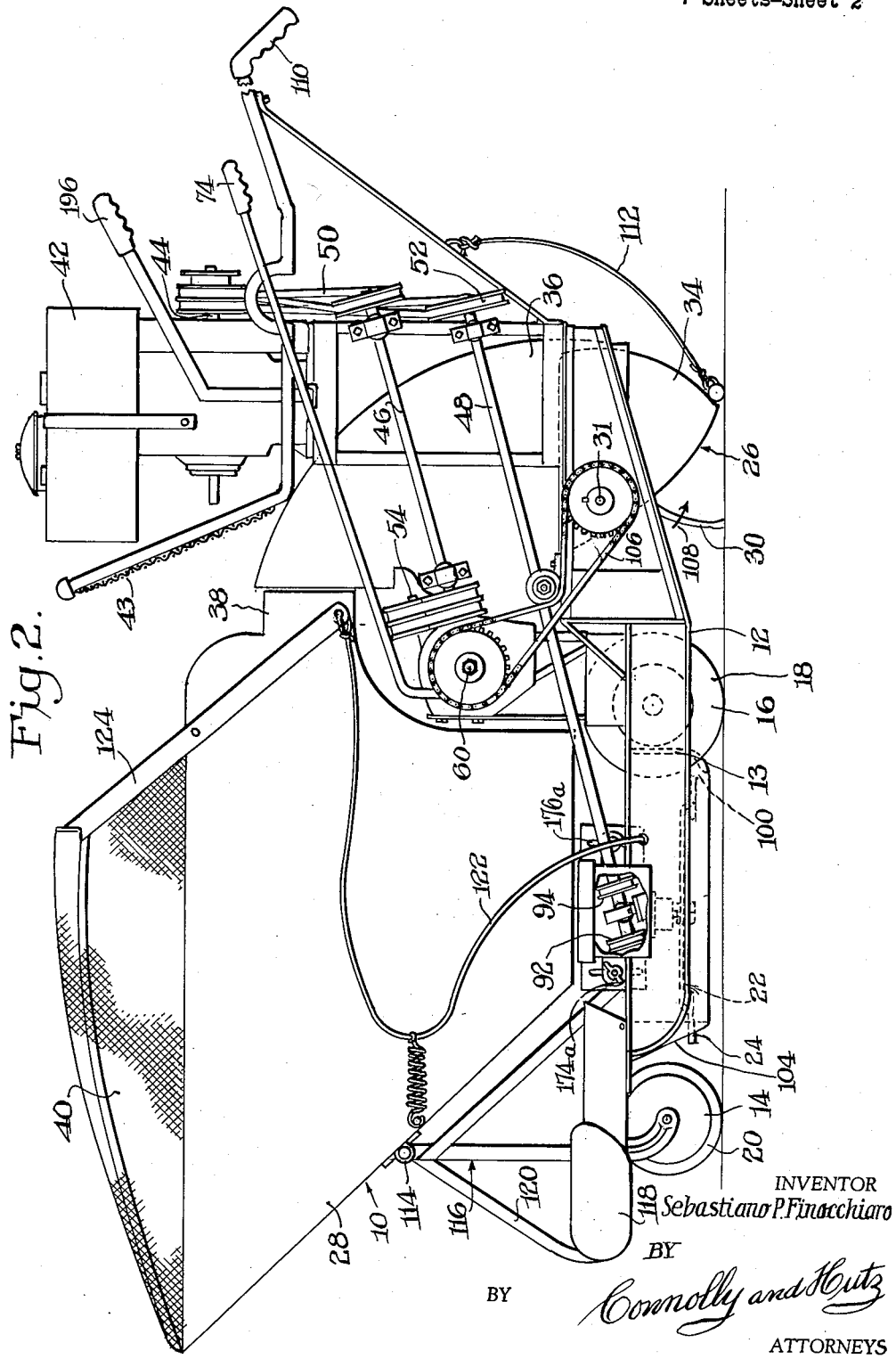

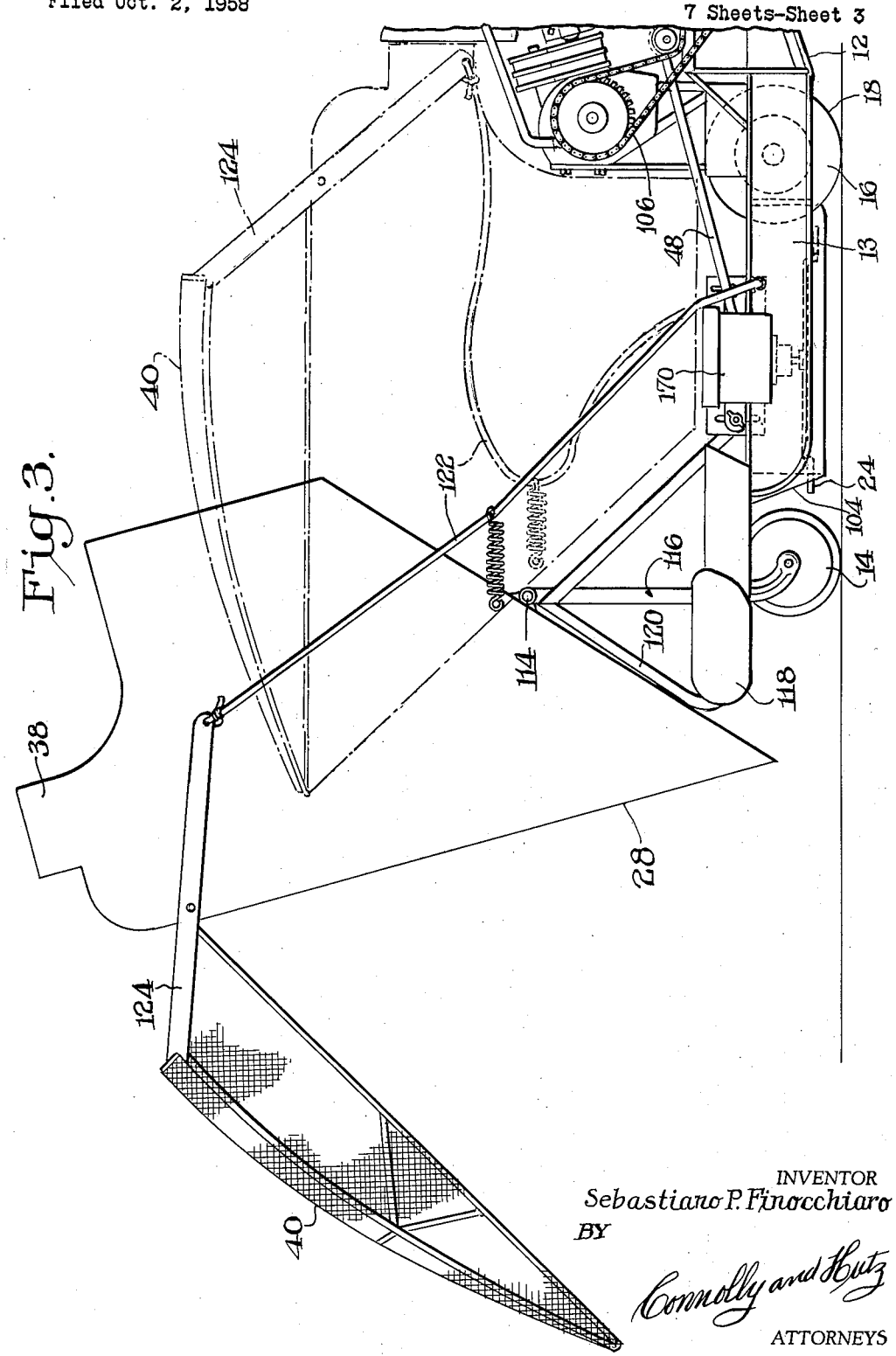

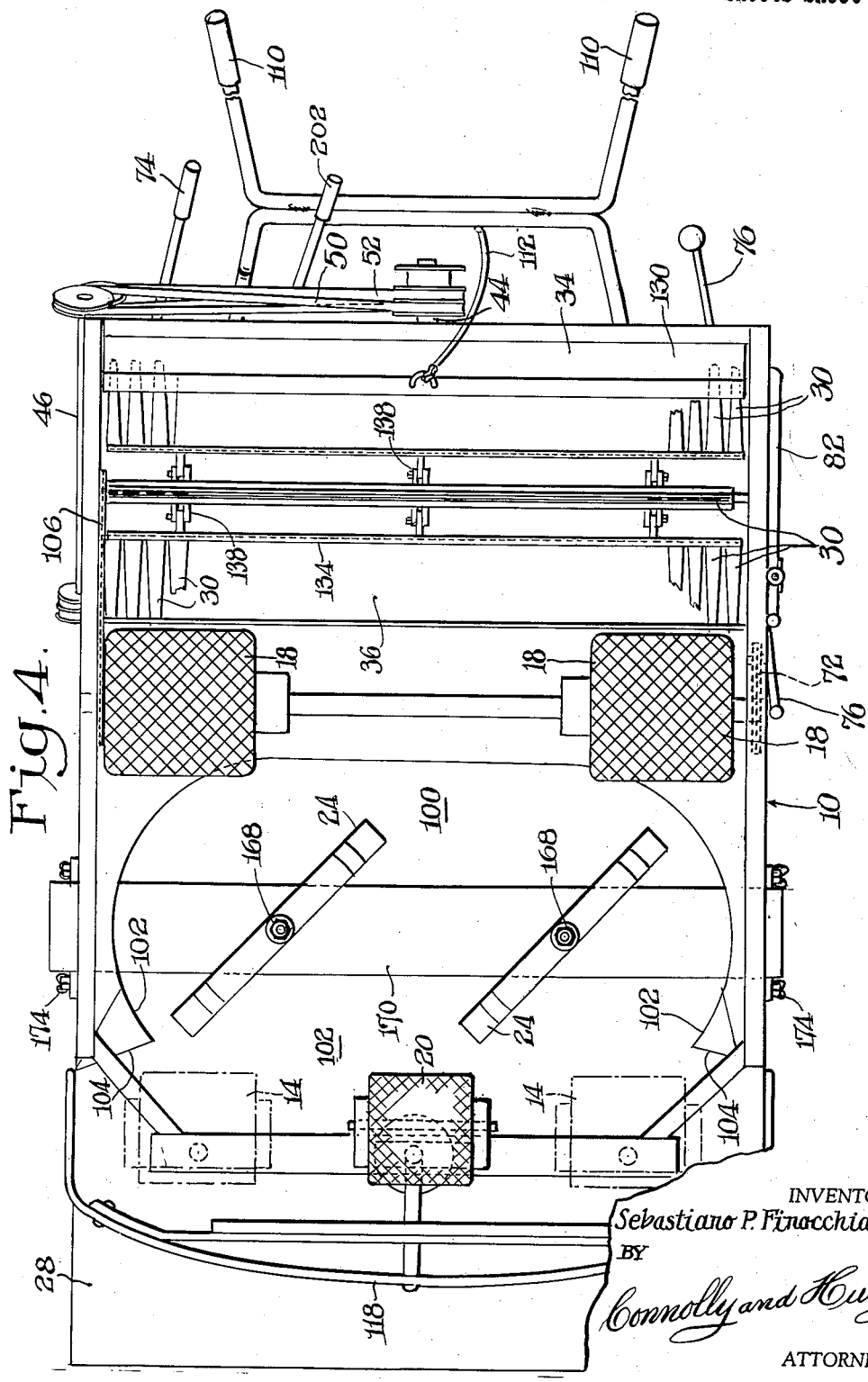

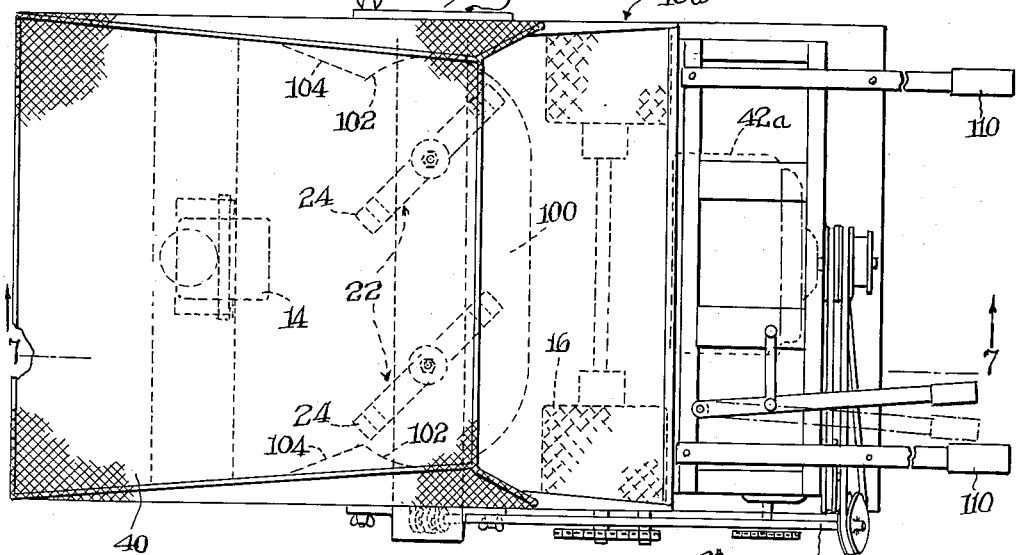
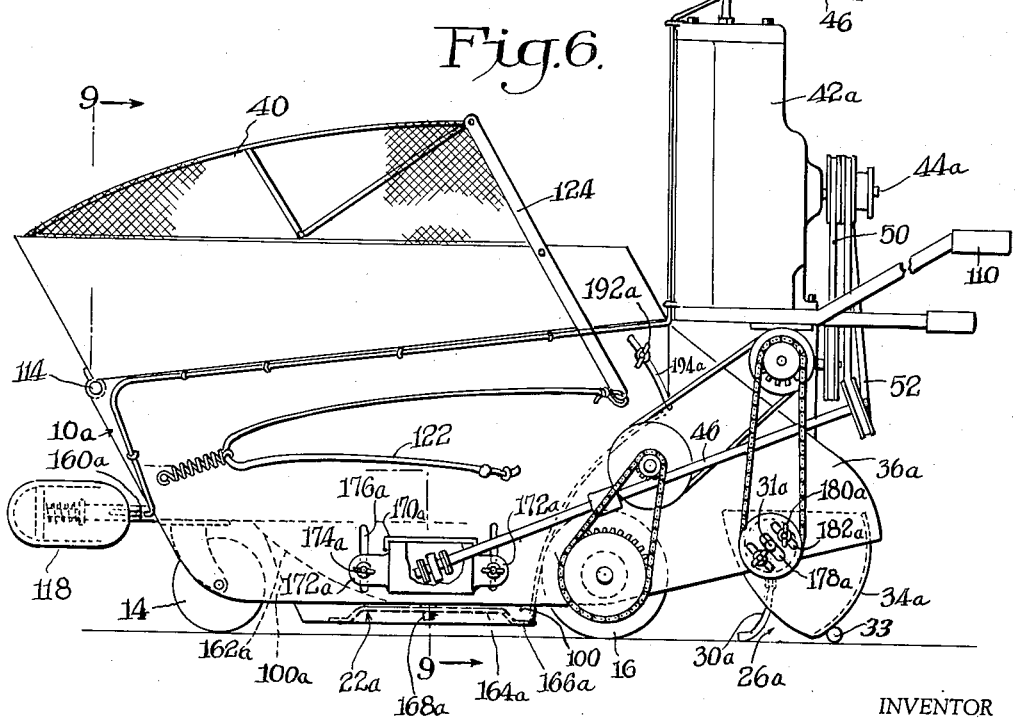

Dec. 20, 1960                S. P. FINOCCHIARO                2,964,896
                        DEBRIS-GATHERING APPARATUS
Filed Oct. 2, 1958                                      7 Sheets-Sheet 6

INVENTOR
Sebastiano P. Finocchiaro
BY Connolly and Hutz
ATTORNEYS

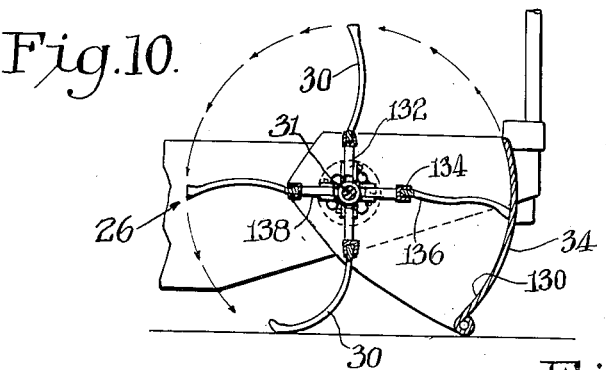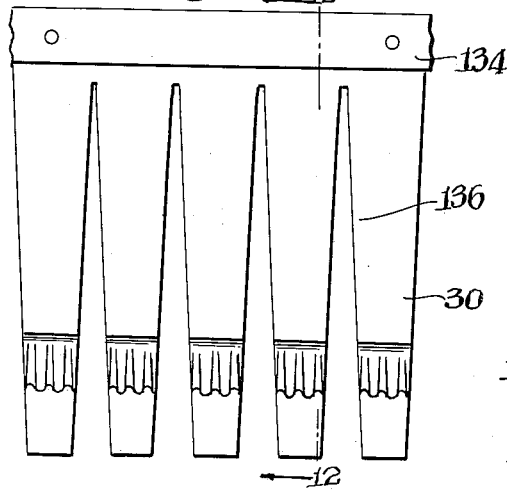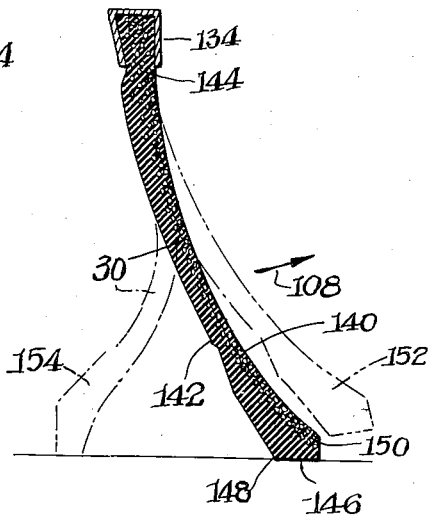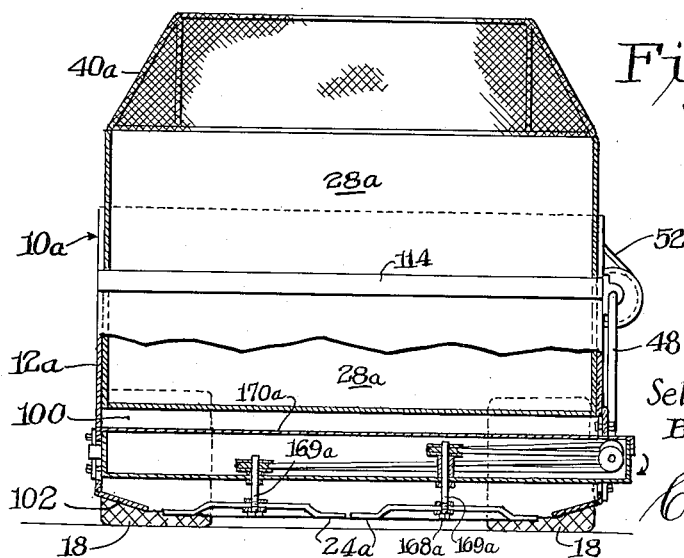

United States Patent Office 2,964,896
Patented Dec. 20, 1960

2,964,896
DEBRIS-GATHERING APPARATUS

Sebastiano P. Finocchiaro, Wilmington, Del., assignor to Joseph Finocchiaro & Bros., Wilmington, Del., a partnership Filed Oct. 2, 1958, Ser. No. 764,879

21 Claims. (Cl. 56—157)

This invention relates to an apparatus for gathering debris from the ground, and more particularly relates to an apparatus for gathering debris such as leaves, twigs, bark, grass, hedge clippings and the like from a lawn.

The current widespread interest in lawn care has developed a corresponding interest in the development of various machines for gathering debris from grassy surfaces. Although this debris may include twigs, bark, grass and hedge clippings, such apparatus is particularly useful for picking up the torrent of leaves which fall to the ground in the autumn. These leaves, if allowed to remain where they fall, may smother and kill the grass under them.

Machines that have been proposed heretofore for picking up leaves and other debris from lawns having utilized various principles of operation including the brush and vacuum lift principle, and some of them are moderately successful where the leaf deposits are not too heavy and where they are not wet. However, if the leaves should lie thick and have been wet by either heavy rains or by early snowfall, existing machines are practically of no use in picking them up. This problem is of a critical nature to professional lawn caretakers who must service large expanses of grassy terrain.

An object of this invention is to provide an efficient apparatus for gathering debris from lawns which does not harm the grass upon which this debris is deposited.

Another object is to provide such an apparatus which is not incapacitated by wet conditions.

In accordance with this invention, an apparatus for gathering debris from lawns includes a horizontal rotor cutting means which may include a pair of cutting rotary blades mounted close to the ground on a vertical axis of rotation, followed by a rotating brush mounted upon a horizontal axis of rotation which sweeps the ground after the rotor means. A debris-collecting hopper is mounted above the rotor means, and a trailing enclosure drags on the ground behind the horizontal brush. A channel connects the brush enclosure with the hopper and extends in a forward direction for directing debris gathered by the brush into the hopper. A partially confining enclosure may be used about the rotor means to permit the debris to be maintained in its vicinity for a time sufficient to comminute it before it is picked up by the brush.

This apparatus may incorporate a unique brush whose blades are flexible and which are deflected backward by rubbing against the walls of their enclosure and then are released to kick the debris into the hopper. These blades are, for example, made in a comb form of a curved flexible section having a leading edge or surface formed of a material susceptible to absorption of moisture and shrinkage, and a trailing edge or surface formed of a relatively non-absorbent material. If debris, such as leaves, should be wet, the leading edges of the blades absorb moisture and shrink while the trailing edges are relatively unaffected. This stiffens the blades and permits them to exert a greater amount of force upon wet debris. This provides automatic compensation for the greater heavier weight of wet debris, such as leaves, in contrast to the limp condition of other types of flexible blades when they are wet. Such blades are conveniently made, for example, of a section of an automobile tire with the fabric interior of the tire wall serving as the leading edge. The tip of this leading edge or surface is cut to facilitate its absorption of moisture.

The leaf-gathering hopper may include several features which enhance its operation. It may be hinged adjacent its front end to permit it to be rotated forward for dumping. A hinged screen cover, for example, of clam shell shape may be mounted upon the top of the hopper to permit air to pass through it while debris is trapped. The lower rear wall of this hopper may be adjustable for either directing debris from the brush into the hopper or for diverting debris back to the rotor means to permit grinding to a finer particle size. This permits the dropping of fine mulching deposits or the grinding of the leaf particles to a very fine size to allow greater quantities to be stored in the hopper.

Various transmission arrangements may be provided for the wheels, brush and rotor means to permit variation of brush and vehicle speed, or to permit the brush and rotor means to be stopped while the apparatus is moved from place to place.

Novel features and advantages of the present invention will become apparent to one skilled in the art from a reading of the following description in conjunction with the accompanying drawings wherein similar reference characters refer to similar parts and in which:

Fig. 1 is a fragmentary top plan view of one embodiment of this invention;

Fig. 2 is a side view in elevation of the embodiment shown in Fig. 1;

Fig. 3 is a partial side view in elevation of the embodiment shown in Fig. 1 in two optional operative positions;

Fig. 4 is a fragmentary bottom plan view of the embodiment shown in Fig. 1 partly broken away;

Fig. 5 is a top plan view of another embodiment of this invention;

Fig. 6 is a side view in elevation of the embodiment shown in Fig. 5;

Fig. 9 is a cross-sectional view taken through Fig. 6 along the line 9—9;

Fig. 10 is a schematic view of a portion of the embodiments shown in Figs. 1 and 5;

Fig. 11 is a view in elevation of a portion of the embodiments shown in Figs. 1 and 5; and Fig. 12 is a cross-sectional view taken through Fig. 11 along the line 12—12 in several alternative operative conditions.

Figure 7:
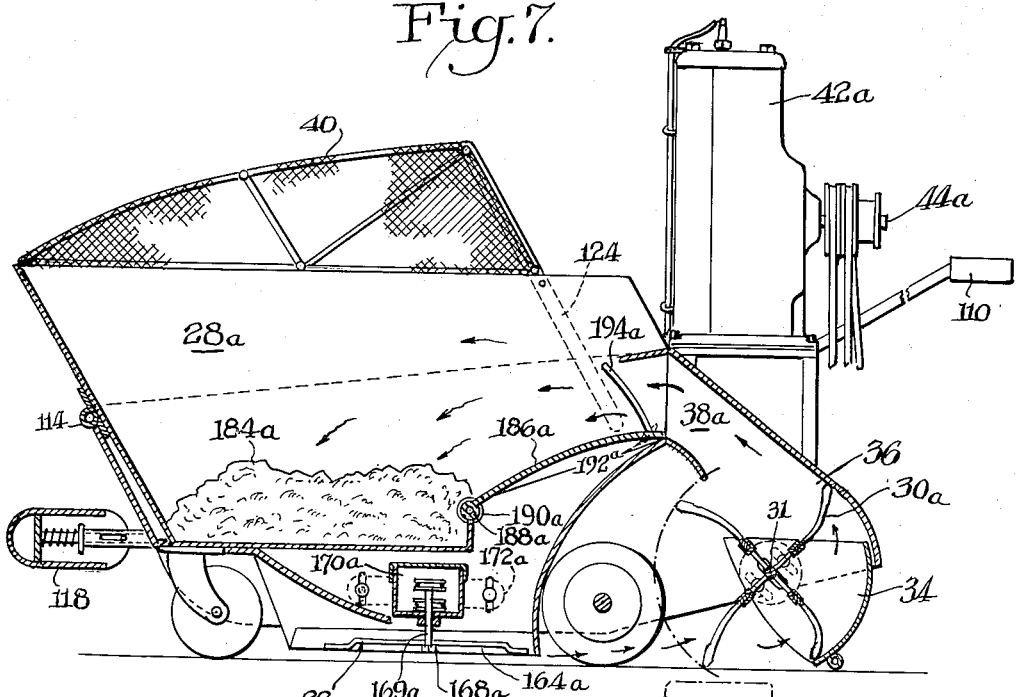
Figs. 7 and 8 are cross-sectional views in elevation taken through the embodiment shown in Fig. 5 in different phases of operation.

In Figs. 1 and 2 is shown a debris-gathering apparatus 10 incorporating a frame 12 formed, for example, of channels 13 mounted on front wheels 14 and rear wheels 16. Front wheel 14 is, for example, a fully pivoting castered front support wheel, and wheels 16 are, for example, driving wheels or rollers incorporating, for example, rubber tires 18. Front wheel 14 also has a rubber tire 20, and a number of front wheels 14, for example three, may be provided as shown in Fig. 4 to support heavier loads. The rubber tires carry the apparatus over lawns without damaging the grass.

This is important particularly when the ground is wet and soft under which conditions this apparatus is of most critical utility.

A horizontal rotor means 22 is mounted upon a vertical axis of rotation with its blades 24 disposed close to the ground. Horizontal rotor means 22 includes a pair of rotor blades 24 driven in a manner later described in detail. However, a single rotary blade may be utilized in a more compact embodiment of this invention. These blades 24 cut away taller grass in which debris is embedded and agitate this debris to facilitate its pick up by the following brush. Blade 24 may also be adjusted for cutting grass in a similar manner to that accomplished by the ordinary rotary lawn mower. However, the primary functions of rotor means 22 are the cutting up and agitation of debris lying on the ground to facilitate its pick-up and to permit larger quantities to be packed into the debris-gathering hopper 28 supported above rotor means 22 in a manner later described in detail.

Brush assembly 26 is, for example, rotatably mounted upon a horizontal shaft, designated 31. It includes blades or fingers 30, one of which is shown extending downwardly from trailing enclosure 34 in Fig. 2 which also is rotatably mounted upon shaft 31 to permit the lower end to slide over the ground upon a runner 33 which is, for example, a bar welded across the lower end of pivoted enclosure 34.

A housing 36 surrounds the trailing enclosure 34 and provides a channel therewithin connecting enclosure 34 with the rear entrance 38 to hopper 28. Leaves or other debris agitated by rotor means 22 are accordingly picked up or kicked by blades 30 of brush 36 into trailing enclosure 34 through the channel within housing 36 into the rear entrance 38 of debris-collecting hopper 28. Air propelled along with debris by blades 30 is expelled through screen lid 40 made, for example, of clam shell shape and movably connected to the top of hopper 28 in such fashion to permit it to be raised away from the front end of hopper 28 when it is tilted to dump debris in the position shown in Fig. 3.

The motive power for driving the wheels 14 and 16, apparatus 10 and various other moving portions of it is provided by a prime mover 42 which, for example, is a five horsepower gasoline motor. A screen 43 is mounted in front of the air intake to motor 42 to prevent it from being clogged by flying debris. Motor drive shaft 44 of motor 42 is connected to intermediate drive shaft 46 for the wheels and brush and to intermediate drive shaft 48 which is connected to the rotor means 22.

Belt and pulley drive 50 connects motor drive shaft 44 with intermediate shaft 46 which drives the wheels and brush, and belt and pulley drive 52 connects motor shaft 44 with intermediate shaft 48 which drives the rotors. These drives are shown in Figs. 1 and 2. Referring principally to Fig. 1, drive shaft 46 is connected to a pinion shaft 54 by means, for example, of a double V-belt and pulley drive 56 which is made double to provide added driving power. Pinion 58 mounted upon shaft 54 drives a stub shaft 60 connected at one end to clutch 62 which permits brush 26 to be disengaged from the drive. The other end of stub shaft 60 is connected through a connecting drive shaft 64, clutch 66, variable speed transmission 68, additional shaft 70, and a sprocket and chain drive 72 to the wheels 16. Handle 74 permits engagement and disengagement of clutch 62 to either drive or release brush 26, and handle 76 when moved forward and backward, for example, engages or disengages clutch 66 to the wheel drive through fork 78.

Clutches 62 and 66 are, for example, of the disc type conventionally used, for example, in lighter automotive transmissions; and variable speed transmission 68 is, for example, a gear type transmission, for example, of the type used in a lighter automobile such as an Austin. Variable transmission 68 is, for example, operated through four speeds by means of a gear shift and plate unit 80 connected to transmission 68 through a suitable linkage 82.

Intermediate drive shaft 48 is, for example, connected to the pair of blades 24 in rotor means 22 by an unusual belt and pulley drive 84 in which a single pulley belt 86 is used to drive rotor pulleys 88 and 90 from a pair of pulleys 92 and 94 mounted upon drive shaft 48. Belt 86 is wound about the pulleys in the manner shown and described herein to drive rotor blades 24 towards each other from front to back of the apparatus to induce debris to enter into the center of the apparatus. Belt 86 starting from pulley 88 passes in the direction of arrow 96 to the bottom of pulley 92. It then passes over the top of pulley 92 and along arrow 93 and then around pulley 90 driving one of blades 24 in the direction of arrow 95. It then passes under and up around pulley 94 and then from the top of pulley 94 it passes along arrows 97 and 99 about the rear side of pulley 88 where it is connected to its original starting point.

A partially confining or concentrating enclosure 100 surrounds rotor means 22 at its sides, top and rear to hold the debris in the vicinity of the rotor blades 24 long enough to comminute it before it passes on to the brush. The front end 102 of channel 100 is inclined slightly inwardly towards the front of the apparatus, and a pair of deflecting projections 104 provide a smooth tapering entrance to front end 102 for diverting debris into the direction of rotor means 22.

A sprocket and chain drive 106 connects clutch 62 with horizontal shaft 31 upon which brush 26 is mounted. As shown in Fig. 2, blades 30, extending downwardly from trailing enclosure 34, move in the direction of arrow 108 to kick debris into trailing enclosure 34, through housing 36 and into entrance 38 of hopper 28. The main features of brush 26 are later described in detail.

Auxiliary features of this machine are guiding handles 110 to which are attached line 112 connected to the rear of trailing enclosure 34. Line 112 is used for lifting enclosure 34 above the ground when the brush is not in active operation. Hopper 28 is pivoted about axle 114, for example, by a hinged mounting supported upon a frame work 116 which is mounted above bumper 118 at the front end of apparatus 10. Hopper 28 is restrained from turning all the way over from the dumping position by front bar 120 of frame work 116. A cable 122 is attached from a fixed point on frame 12 to a pivoted bar 124 rotatably mounted near the rear end of hopper 28 for automatically lifting clam shell screen 40 from the front end of hopper 28 when it is lowered into the dumping position.

In Fig. 10 is shown a schematic diagram of brush 26 in operation. Blades or fingers 30 of brush 26 are shown therein in various operative positions. At the top of their path of movement, blades or fingers 30 are relatively unflexed from the original configuration shown in solid outline in Fig. 12. As blades 30 travel downward and strike the ground, they flex backwards, for example, a distance of approximately two inches and thereby store sufficient energy to drive the debris into enclosure 34 whose rear wall is designated 130 in Fig. 10. As blades 30 move through enclosure 34, they are flexed backward a substantial distance. However, as the blades move off the end of rear wall 130, they kick forward to their original unflexed condition at the top of their path of travel to impart a substantial and forceful kicking action to the leaves thereby driving them into the hopper. This kicking action also promotes a following air flow which helps propel the leaves.

Blades 30 are shown mounted upon holders or bars 132 which are attached to horizontal shaft 31. A lateral section of brush 26 showing bracket 134 within which a comb-shaped section 136 including separate blades 30 is mounted. Brackets 134 are connected to shaft 31, for example, by bars 138 which may be made adjustable to vary the position of blades 30 relative to the ground and rear wall 130 of enclosure 34. As shown in Fig. 12, blades 30 include a leading edge or surface 140 formed of a material which readily absorbs water and shrinks upon so doing, and a rear wall edge or surface 142 of material which does not appreciably absorb water or shrink. These blade sections are, for example, advantageously formed of a section of a tire casing, and the rim section 144 is mounted within bracket 134 and the edge 146 of the tread forms the curved top of blade 30. A thickened lower projection 148 upon the ends of blades 30 provides resistance to wear.

Although the tire section shown in Figs. 11 and 12 was originally selected primarily for its curved configuration, it was unexpectedly found that in the presence of moisture, the fabric tire wall readily absorbs moisture thereby causing it to shrink. This absorption is enhanced when the lower end 150 of leading edge 140 is cut. This causes the blade to curl upward into the position designated as 152 which stiffens it and lends it added resistance to imposed forces in wet weather. This provides supplemental force and resiliency for throwing heavier wet leaves forward into enclosure 34 and maintaining the blades 30 in firm contact with its rear wall 130 as they drive the wet leaves upward and forward.

The other position of blade 30, designated as 154 in Fig. 12, represents the rearward flexed position of the blade as it drags along the ground.

In Figs. 5–9 is shown another embodiment 10a of this invention which is similar to embodiment 10 shown in Figs. 1–4 with several exceptions and modifications. One difference, for example, is the fact that the frame 12a is made of sheet material rather than the channel section 13 shown in Fig. 2. This makes the apparatus more compact and more economical to manufacture.

Another addition to apparatus 12a is the automatic trip or disabling apparatus 160a mounted upon bumper 118a which shuts off motor 42a, for example, by interrupting the ignition, when an obstacle is struck. This helps prevent any human or animal from being drawn under apparatus 10a and harmed by the rapidly rotating rotor means 22a.

As shown in Fig. 6, the upper wall 162a of enclosure 100a is sloped downwardly to direct debris into rotors 22a. Each blade 24a includes, for example, an upwardly raised section 164a to permit tips 166a to cut close to the ground despite the presence of a fastening nut 168a holding the rotors of their shafts. Rotor blades 24a are, in a manner, similar to rotor blades 24, mounted upon shafts 169a supported within a hollow beam 170a which is adjustable upward and downward by means of brackets 172a and wing nuts 174a extending through slots 176a in the side of apparatus 10a as shown in Fig. 6 to permit the vertical position of rotor blades 24a to be varied.

The vertical position of shaft 31a upon which brush 26a is mounted is accordingly varied by disposition of shaft 31a in vertically disposed slots 178a and securing wing nut 180a disposed in slots 182a.

Figure 8:
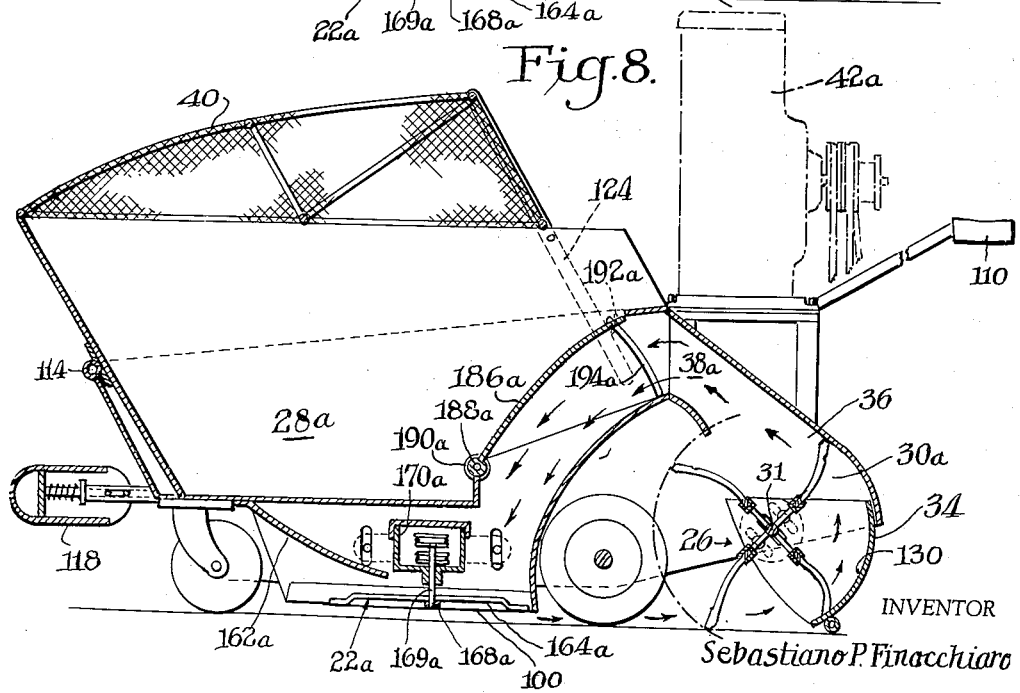

In Figs. 7 and 8 are shown diagrammatic side views in elevation of the apparatus shown in Figs. 5–9. However, these same diagrammatic representations refer to the functional portions of the apparatus shown in Figs. 1–4 with the exception of the alternative positions of the hopper floor which would be slightly differently arranged if embodied in the apparatus shown in Figs. 1–4.

In Fig. 7, hopper 28a is shown in its gathering position in which debris is kicked by blades 30a through entrance 38a into a heap 184a in the bottom of hopper 28a. The lower rear floor 186a of hopper 28a is pivoted about a hinge 188a and biased by means of a torsion spring 190a, for example, into the lower position shown in Fig. 7. This permits the lower wall 186a to guide propelled debris into hopper 28a where it is collected.

The alternative or mulching position is shown in Fig. 8 in which pivoted wall 186a is raised by means of raising wing nut and suitable extension 192a in slot 194a which permits torsion spring 190a to raise lower wall 186a to the upper position in which it diverts debris from brush 26a back into rotor means 22a thereby permitting further grinding and comminution. After sufficient comminution, this debris may be allowed to remain on the ground to act as a fertilizer.

A provision is also made for permitting the operator to disengage the drive to all moving parts of the machine in an emergency, for example, by movement of a single control, for example, lever 196 shown in Figs. 1 and 2. Lever 196 is connected through a jackknife linkage 198 to the base 200 of gasoline motor 42. When lever 196 is moved into the position shown in phantom outline at 202, it collapses jackknife linkage 198 against the force of spring 206 and moves motor base 200 along slots 204, shown in Fig. 1, towards intermediate drive shafts 46 and 48. This releases the tension on belt and pulley drives 50 and 52 which respectively transmit power to shafts 46 and 48 thereby interrupting the operation of all moving parts of the apparatus including the rotors, brush assembly and wheels.

Operation

In the normal operation of this apparatus, it is allowed to move in the forward direction to permit the cutting rotor means to cut up and agitate debris such as leaves before the brush means impels them into the hopper. The rotor blades also cut away any grass that may have grown up, through, or around embedded leaves which makes it easier for the brush to remove the debris and leaves a thoroughly trimmed and cleaned lawn after passage of the apparatus.

If the debris or leaves deposited on the lawn is rather light, it may be mulched and left at the base of the lawn by raising the lower rear hopper floor as shown in Fig. 8. This diverts the debris back into the rotary blades for a number of circulations depending upon the forward speed of the apparatus until the particles are made too small to be easily picked up by the brush. This system of mulching is far more effective than the use of a rotary blade alone because a rotary blade alone is not able to raise deeply embedded leaves.

After the hopper is filled, the debris is dumped by tilting it forward into the vertical position as shown in Fig. 3. This dumping action automatically throws the clam shell screen cover open allowing the debris to slide out.

When debris such as leaves are very deep or very wet, more strokes of the brush per foot of travel are required to thoroughly clean the ground. This is provided by the variable speed transmission to the wheels which permits the forward motion of the machine to be slowed down while the brush is rotated at a constant speed. The speed of the vehicle may, therefore, be co-ordinated with the amount of brushing action required for a given weight of deposit of debris. As shown herein, four sets of blades are provided on the brush to provide four brush strokes for each rotation of the brush shaft. However, some of these sets may be eliminated where the pick-up load is light.

When it is desired to gather leaves whole for bedding, etc., the transmission to the cutting rotors may be interrupted for example, by removing the belt, or the trailing enclosure about the brush may be lifted and the machine moved in the direction towards the guiding handles, otherwise described as the rear direction. This rear movement permits the apparatus to be used for cleaning sidewalks or bare areas of lawns or for the gathering of very heavy compost or leaves.

As previously described in detail, the comb-shaped brush sections are each made, for example, of a section of tire walls. The blades or fingers of the brush, therefore, curve forward like human fingers. The rubber nonabsorbent trailing surface of these fingers is thick near the rim section and gradually becomes thinner towards the contact tips of the teeth or blades at which extra rubber is allowed to remain from the tread section of the tire to provide wear resistance and strength.

On wet days when extra pressure is required to propel stuck or embedded leaves or other debris, the exposed ply absorbs moisture and shrinks the front or leading surface of the tooth or blade causing it to curve or curl forward. This stiffens the blade and permits it to exert a greater pressure upon debris.

The size of particles left on the lawn after passage of the brush is partially determined by the space between fingers, and the stiffness of the blade is determined by the thickness of its wall and configuration of fabric and nonabsorbent backing.

The brush can be adjusted as shown in Fig. 6 to apply either a heavy or light pressure to the ground, or it may be set to merely touch the surface of the lawn. At all heights, however, the fingers or blades of the brush are adjusted to contact the trailing enclosure with enough interference to bend the blades or fingers back about two inches. This provides sufficient kickoff as the blades leave the trailing enclosure to throw the debris forcefully into the hopper. Contact of the brush fingers with the drive wheels or drive rollers maintains them clean of foreign material such as mud in wet weather.

Once the brush is adjusted on bare ground, it may be used without further adjustment on thick or thin lawns. The length and flexibility of the fingers of the brush permit it to adjust to rough and rooted lawns without harming either the ground or brush. Since the end blades or fingers of the brush may bend all the way back without harming it or unduly wearing it, vines or limbs do not harm it if they tangle around the hub or shaft of the brush.

What is claimed is:

1. An apparatus for gathering debris from the ground comprising a frame, said frame being mounted upon mobile means to facilitate its movement along the ground, a horizontal rotor means mounted adjacent the ground upon said frame on a vertical axis of rotation, a confining chamber being mounted upon said frame about the periphery of said rotor means leaving the space between said rotor means and said ground unobstructed for confining debris agitated from said ground by said rotor means in the vicinity of said rotor as it agitates and comminutes said debris, the front end of said confining chamber being maintained open to facilitate the direction of debris into said rotor means, a rotating brush means mounted upon a portion of said frame in back of said rotor means on a horizontal axis of rotation, drive means connected to said rotor means and said brush means for simultaneously rotating them to agitate and lift debris from the ground directly into the path of said rotating brush means and for rotating said brush means, a debris-collecting hopper mounted upon said frame above said rotor means and said brush means, and a trailing enclosure surrounding the outer periphery of said brush means and connecting it with said hopper to guide debris agitated by said rotor means and lifted by said brush means through said trailing enclosure into said hopper.

2. An apparatus as set forth in claim 1 wherein said brush means includes flexible and resilient blades, the portion of said trailing enclosure adjacent said brush means being close enough to the axis of rotation of said brush means to flex said blades backward as they enter said trailing enclosure, and the portion of said trailing enclosure between said brush means and said hopper being far enough from the axis of rotation of said brush means to permit said blades to spring freely forward to allow them to propel said debris into said hopper.

3. An apparatus as set forth in claim 2 wherein said portion of said trailing enclosure relatively close to the axis of rotation of said brush means is comprised of a pivoted trailing section having a curved rear wall disposed within the free path of movement of the tips of said blades, and said trailing section including runner means which glide over the ground behind said brush means to allow said brush means to sweep said ground cleanly behind said rotor means.

4. An apparatus as set forth in claim 1 wherein said mobile means is comprised of front and rear wheels, said rear wheels being disposed between said cutting rotor means and said brush means, and said brush means contacting said wheels and the rear wall of said trailing enclosure to maintain them free of deposits of foreign matter.

5. An apparatus as set forth in claim 1 wherein the top of said hopper is substantially open, and a screen member is disposed over it to permit air discharged into said hopper to escape and to confine debris discharged within said hopper.

6. An apparatus as set forth in claim 1 wherein said hopper is rotatably mounted upon said frame to permit it to be tilted to dump debris collected therein.

7. An apparatus as set forth in claim 1 wherein said rotor means includes a pair of rotors which rotates towards each other from front to back.

8. An apparatus as set forth in claim 1 wherein said concentrating chamber includes side and top walls which taper inwardly and downwardly respectively.

9. An apparatus as set forth in claim 1 wherein a prime mover is mounted upon said frame for driving said rotor means, said brush means and said mobile means; and transmission means connects said prime mover to said rotor means, said mobile means and said brush means to permit control and optional movement thereof.

10. An apparatus as set forth in claim 9 wherein clutch means are interposed in said transmissions to said brush means and said mobile means to permit alternative or simultaneous movement thereof.

11. An apparatus as set forth in claim 10 wherein said transmission means to said mobile means includes a speed-changing device to permit the relative speeds of movement of said mobile means and said brush means to be varied.

12. An apparatus as set forth in claim 9 wherein said prime mover is comprised of a gasoline motor having a drive shaft, a dual-purpose intermediate shaft is provided in the transmission to said mobile and brush means, an additional intermediate drive shaft being provided in the transmission to said rotor means, and said intermediate and said additional intermediate drive shafts being connected to said motor drive shafts by belt and pulley means.

13. An apparatus as set forth in claim 9 wherein said rotor means includes a pair of horizontal rotor blades mounted upon vertical axes of rotation, an intermediate drive shaft is included in the transmission to said rotor blades, each of said rotor blades having pulley means connected thereto, a pair of pulley means being mounted upon said intermediate drive shaft, a single belt means being looped about all of said pulley means to drive said rotor means towards each other in a direction from front to back of said apparatus, and said belt means passing about the pulley remote from said intermediate shaft under and over said pulleys upon said intermediate shaft and around said pulley upon said rotor blade adjacent said intermediate shaft from the upper portion of the pulley mounted adjacent the forward end of said intermediate shaft to the lower portion of the other pulley upon said intermediate shaft.

14. An apparatus as set forth in claim 1 wherein said rotary brush means is comprised of a set of flexible blades attached to a shaft, the leading edges of said flexible blades being formed of a material susceptible to absorption of moisture and shrinkage and the trailing edge of said blades being formed of a relatively nonabsorbent material to cause said blades to curl forward when they become wet thereby permitting said blades to exert a greater amount of force upon wet debris.

15. An apparatus as set forth in claim 14 wherein said blades are formed of a comb-shaped section having an upper continuous web from which individual blades extend.

16. An apparatus as set forth in claim 14 wherein said blades are cut from a section of tire, said portions of said blades attached to said shaft being taken from the portion of said tire adjacent its rim, and said ends of said blades remote from said shaft being taken from portions of said tire adjacent its tread.

17. A blade for rotary brush means in a debris-collecting apparatus comprising a flat section having a leading and a trailing surface, said leading surface being formed of a material susceptible to absorption of moisture and shrinkage, and said trailing surface of said blades being formed of a relatively non-absorbent material to cause said blade to curl forward when it becomes wet thereby permitting said blade to exert a greater amount of force upon wet debris.

18. An apparatus as set forth in claim 17 wherein said blade is cut from a section of a rubber tire extending from a portion of said tire adjacent said rim to a portion of said tire adjacent its tread.

19. A blade as set forth in claim 17 wherein a number of said blades are formed of a comb-shaped section having an upper continuous web from which individual blades extend.

20. An apparatus as set forth in claim 19 wherein said comb-shaped section is cut from the wall of a tire with said web being taken from the portion of said tire wall adjacent its rim, and said blades extending to a portion of said tire wall adjacent its tread.

21. An apparatus as set forth in claim 1 wherein said horizontal rotor means incorporates a cutting means.

References Cited in the file of this patent

UNITED STATES PATENTS

| | | |
|---|---|---|
| Re. 23,972 | Ronning | Mar. 29, 1955 |
| 1,301,329 | Smith | Apr. 22, 1919 |
| 1,819,133 | Stegeman et al. | Aug. 18, 1931 |
| 2,506,054 | Agee et al. | May 2, 1950 |
| 2,670,486 | Daniell | Mar. 2, 1954 |
| 2,712,211 | Smith et al. | July 5, 1955 |